United States Patent
Reynolds (10) Patent No.: US 8,661,769 B2
(45) Date of Patent: Mar. 4, 2014

(54) THIN MIRROR WITH TRUSS BACKING AND MOUNTING ARRANGEMENT THEREFOR

(75) Inventor: Glenn Alan Reynolds, Long Beach, CA (US)

(73) Assignee: Gossamer Space Frames, Huntington Beach, CA (US)

( * ) Notice: Subject to any disclaimer, the term of this patent is extended or adjusted under 35 U.S.C. 154(b) by 0 days.

(21) Appl. No.: 13/366,893

(22) Filed: Feb. 6, 2012

(65) Prior Publication Data

US 2012/0131916 A1 May 31, 2012

Related U.S. Application Data

(63) Continuation of application No. 12/910,625, filed on Oct. 22, 2010, now Pat. No. 8,132,391.

(60) Provisional application No. 61/279,602, filed on Oct. 23, 2009.

(51) Int. Cl.
*E04C 2/54* (2006.01)
*E04B 1/18* (2006.01)

(52) U.S. Cl.
USPC ........................................ 52/783.1; 52/783.11

(58) Field of Classification Search
USPC .............................. 52/783.1, 783.11, 633–639
See application file for complete search history.

(56) References Cited

U.S. PATENT DOCUMENTS

| | | | | |
|---|---|---|---|---|
| 1,433,232 A * | 10/1922 | Rogers | ............... | 52/443 |
| 2,990,038 A * | 6/1961 | Diamond | ............... | 52/636 |
| 3,008,551 A * | 11/1961 | Cole | ............... | 428/132 |
| 3,050,831 A * | 8/1962 | Diamond | ............... | 29/897.31 |
| 3,415,027 A * | 12/1968 | Bradley et al. | ............... | 52/263 |
| 3,793,791 A * | 2/1974 | Wootten | ............... | 52/789.1 |
| 3,830,678 A * | 8/1974 | Behunin | ............... | 156/349 |
| 4,039,708 A * | 8/1977 | Okada | ............... | 428/73 |
| 5,979,139 A * | 11/1999 | Early | ............... | 52/791.1 |
| 6,200,664 B1 * | 3/2001 | Figge et al. | ............... | 428/178 |
| 6,207,256 B1 * | 3/2001 | Tashiro | ............... | 428/178 |
| 6,644,535 B2 * | 11/2003 | Wallach et al. | ............... | 228/173.5 |
| 7,288,326 B2 * | 10/2007 | Elzey et al. | ............... | 428/593 |
| 7,424,967 B2 * | 9/2008 | Ervin et al. | ............... | 228/193 |
| 7,856,776 B2 * | 12/2010 | Van Der Lee | ............... | 52/235 |
| 8,281,475 B2 * | 10/2012 | Cabanski et al. | ............... | 29/513 |
| 2002/0020134 A1* | 2/2002 | Collard | ............... | 52/694 |
| 2005/0183376 A1* | 8/2005 | Shoji | ............... | 52/633 |

FOREIGN PATENT DOCUMENTS

NL WO2005121475 * 12/2005
WO WO2009/034226 * 3/2009

* cited by examiner

*Primary Examiner* — Mark Wendell
(74) *Attorney, Agent, or Firm* — Blue Capital Law Firm, P.C.

(57) ABSTRACT

A thin-sheet panel assembly. In one embodiment, a substantially rigid thin-sheet panel assembly having a non-rigid thin-sheet component includes the thin-sheet component which has selected plan area and shape, a backer having a plan shape and area substantially similar to the thin-sheet component, and plural riser elements of selected height and configuration each extending from the backer to distal ends connected to a reverse surface of the thin-sheet component, the riser elements being configured and disposed in an array which causes the assembly to have substantial rigidity in a selected direction in the thin-sheet component, and the thin-sheet panel assembly further includes a bar coupled to the backer and extending between at least one pair of adjacent riser elements of the plural riser elements.

20 Claims, 6 Drawing Sheets

THIN MIRROR WITH TRUSS BACKING AND MOUNTING ARRANGEMENT THEREFOR

CROSS-REFERENCE TO RELATED APPLICATIONS

This application is a continuation of U.S. patent application Ser. No. 12/910,625, filed Oct. 22, 2010 now U.S. Pat. No. 8,132,391, which claims the benefits of U.S. Provisional Application 61/279,602 filed Oct. 23, 2009, the entire disclosures of which are incorporated by reference.

FIELD

Aspects of embodiments of the present invention relate to a thin-sheet panel assembly, and more particularly to a thin-sheet panel assembly adapted for use in solar collector applications.

BACKGROUND

Solar collection facilities utilize solar concentrators and/or photovoltaic panels for harnessing solar energy. Solar concentrator assemblies (SCAs) utilizing movable parabolic trough collectors present large reflective surface areas (apertures) for tracking the sun and focusing the captured radiant energy on linear heat collection elements (HCEs) as a first step in a thermomechanical conversion process for generating electrical power. A solar-trough solar power generation facility typically includes many SCAs arranged in rows to capture great amounts of solar radiant energy.

The reflective surfaces of troughs of SCAs are usually hot-formed, thick-glass minors that ideally conform to a given geometry, notably surface curvature. Operating efficiency of the solar plant is largely dependant on the ability of the mirrors to maintain surface curvature accuracy, so that the mirrors sharply focus reflected sunlight on the HCE. This requires very exacting manufacturing processes for mirror production and high rigidity of the mirrors themselves as mounted to their supports. Thus, the glass is typically formed thicker, often resulting in a mirror weight that rivals the weight of the supporting structure.

Traditionally, hot-formed, glass mirrors are used in various solar concentrating applications, such as the Nevada Solar One solar power generating plant in Nevada. The glass mirror material is hot-formed to the mathematical shape (surface geometry) required to reflect and concentrate sunlight on an HCE. Such hot-formed glass is also known as sagged glass. Sagged glass is thick, heavy, costly to manufacture, costly to transport and install at a facility, and prone to breakage.

The thick glass mirrors (or any other reflectors utilized) must retain their mathematical shape in order to efficiently focus concentrated sunlight, which requires the hot-formed mirror glass to have a sufficient thickness to maintain the mirror shape (usually about three to five millimeters). Problems with the hot-formed glass include that the thicker glass reduces the reflective efficiency of the mirror (more absorption and less reflection of sunlight), has fabrication-related surface error limitations (slope error and edge effects), is more costly due to the increased amount of glass material, and is heavier resulting in undesirable shipping and handling issues. Additionally, thick sheet material is difficult to form in the complex shapes needed for solar power applications and may trap water in the interface which corrodes the silvering.

In some cases, thin-glass and thin-film have been bonded directly against a pre-formed substrate or aluminum plate having a desired curvature, or to a sandwich panel made with the required surface geometry. Sandwich panels are usually comprised of two sheet metal surfaces bonded to a cellular core such as a honeycomb configuration. Historical problems with thin-glass and thin-film bonded directly against a pre-formed curved substrate or plate, or in combination with honeycomb and other types of closed-cell panel construction, are high cost and their affinity for water intrusion when exposed to weather. Trapped water attacks the preferably aluminum components and penetrates the mirror coatings, causing the mirror silvering to corrode.

SUMMARY

Aspects of embodiments of the present invention are directed to a thin-sheet panel assembly. In embodiments of a thin-sheet panel assembly according to the present invention, the truss design of a backing material element is important to providing rigidity to the thin-sheet panel assembly. Embodiments of the thin-sheet panel assembly maintain a thin panel, such as a thin sheet of glass or other reflective material, in a rigid or substantially rigid configuration. Further, embodiments of the thin-sheet panel assembly of the present invention may be utilized in solar collector troughs of a solar concentrator assembly (SCA), for example.

An aspect of embodiments of the thin-sheet panel assembly according to the present invention, as utilized in an SCA, for example, is lighter weight and less costly reflective surfaces. For example, a thin mirror panel of a thin-sheet panel assembly, according to an embodiment of the present invention, may have about one fourth or less of the thickness and weight of sagged glass, and may be manufactured in a flat configuration without hot-forming (but may later be "cold formed" to a desired shape or curvature) and, therefore, may be manufactured at less cost. Another aspect of embodiments of the thin-sheet panel assembly is the "cold" formability of the thin-glass or thin-film. Yet another aspect of embodiments of the thin-sheet panel assembly is greater overall mirror rigidity and, therefore, improved accuracy as utilized in an SCA, for example. Still another aspect of embodiments of the thin-sheet panel assembly is increased ease of installation. Still another aspect of embodiments of the thin-sheet panel assembly is reduced transportation costs. Still another aspect of embodiments of the thin-sheet panel assembly is elimination or reduction of secondary breakage, such as may result from heavy wind forces applied against thick-glass structures. Yet another aspect of embodiments of the thin-sheet panel assembly is interchangeability with or use in combination with existing solar troughs or other devices. Still another aspect of embodiments of the thin-sheet panel assembly is improved reflective performance. Yet another aspect of embodiments of the thin-sheet panel assembly is a substantially open architecture for allowing moisture to drain or evaporate and thereby prevent or deter the accumulation of moisture between components of the assembly.

According to one exemplary embodiment of the present invention, a substantially rigid thin-sheet panel assembly configured as a truss and having a non-rigid thin-sheet component includes the thin-sheet component which has selected plan area and shape and is a first chord of the truss, a backer having a plan shape and area substantially similar to the thin-sheet component and being a second chord of the truss, and plural riser elements of selected height and configuration each extending from the backer to distal ends connected to a reverse surface of the thin-sheet component, the riser elements being diagonal elements of the truss and configured and disposed in an array which causes the assembly to have substantial rigidity in a selected direction in the thin-sheet component, and the thin-sheet panel assembly further includes a bar coupled to the backer and extending between at least one pair of adjacent riser the plural riser elements.

The riser elements may be of substantially uniform height from the backer so that the thin-sheet component and the backer have essentially concentric curvature. An obverse surface of the thin-sheet component may have parabolically cylindrical concave curvature. The thin-sheet component may include a glass layer.

The backer may be defined by a backer sheet, and the riser elements may be defined by portions of the backer sheet that are bent away from the backer sheet and have integral connections to the backer sheet. In one embodiment, the portions of the backer sheet that define the riser elements have substantially hourglass-shaped configurations and the integral connections to the backer sheet are at bases of the hourglass-shaped configurations. In one embodiment, the integral connections of the riser elements to the backer sheet are spaced along substantially parallel lines, and the riser elements are in substantially parallel planes. In one embodiment, the bar extends between the substantially parallel planes.

The riser elements at their distal ends may define connection tabs disposed laterally of the heights of the risers. In one embodiment, the riser elements at their distal ends define respective pairs of connection tabs disposed laterally of the heights of the risers, the connection tabs of each pair of connection tabs extending in opposite directions from the distal end of the riser element. The backer sheet may include aluminum.

The connections of the distal ends of the riser elements to the reverse surface of the thin-sheet component may be bonded connections. The thin-sheet component may include a substrate layer composed principally of a selected synthetic resin material. The thin-sheet component may be reflective of electromagnetic radiation. In one embodiment, the thin-sheet component is reflective of solar radiation.

In one embodiment, a first surface of the thin-sheet component opposite the reverse surface includes at least a portion of a curved reflective surface having a selected curvature for directing and concentrating sunlight onto a receiver of a solar power generation facility. The bar may be attachable to a trough frame supporting the curved reflective surface. The bar may have a hexagonal cross-sectional shape.

According to another exemplary embodiment of the present invention, a support structure for supporting a thin panel to have a substantially rigid configuration includes a backer sheet, and a plurality of riser elements having heights extending in a first direction from proximal ends coupled to the backer sheet to distal ends and having lengths along rows in substantially parallel riser planes, the distal ends of the riser elements being attachable to the thin panel for supporting the thin panel and increasing rigidity of the thin panel in a second direction substantially parallel to the riser planes, wherein the backer sheet is configured to be a first chord of a truss and the riser elements are configured to be diagonal elements of the truss, the thin panel being a second chord of the truss, and the support structure further includes a bar extending between at least one pair of adjacent riser elements of the plurality of riser elements, the pair of adjacent riser elements being in a same one of the rows.

The bar may extend between the rows in a third direction substantially perpendicular to the first and second directions. In one embodiment, the riser elements are defined by portions of the backer sheet that are bent away from the backer sheet, have integral connections to the backer sheet, and have substantially hourglass-shaped configurations with the integral connections to the backer sheet being at bases of the hourglass-shaped configurations.

According to another exemplary embodiment of the present invention, a substantially rigid thin-sheet panel assembly having a non-rigid thin-sheet component includes the thin-sheet component which has selected plan area and shape, and a backer having a plan shape and area substantially similar to the thin-sheet component, the thin-sheet component being attached to a first surface of the backer, wherein the backer includes a backer sheet including a plurality of ribs extending toward the thin-sheet component, and a substrate including the first surface and a plurality of projections extending from a second surface opposite the first surface, each of the projections having a slot at a distal end and receiving an end of a corresponding one of the ribs therein to form an interlocking joint.

In one embodiment, a surface of the thin-sheet component includes at least a portion of a curved reflective surface having a selected curvature for directing and concentrating sunlight onto a receiver of a solar power generation facility.

Other features and advantages of embodiments of the present invention will become apparent from the following detailed description, taken in conjunction with the accompanying drawings which illustrate, by way of example, features and aspects of exemplary embodiments of the present invention.

BRIEF DESCRIPTION OF THE DRAWINGS

The above and other features, aspects, and advantages of the present invention will become better understood with regard to the following description, appended claims, and accompanying drawings where:

DETAILED DESCRIPTION

In the following detailed description, certain exemplary embodiments of the present invention are shown and described, by way of illustration. As those skilled in the art would recognize, the described exemplary embodiments may be modified in various ways without departing from the spirit and scope of the present invention. Accordingly, the drawings and description are to be regarded as illustrative in nature, rather than restrictive. Further, terms such as "upper," "lower," "bottom," "upward," and "downward" are used herein for the purpose of more clearly describing the location and/or orientation of components or features relative to others, as shown in the drawings, for example. However, the use of such terms is not intended or to be regarded as limiting the use of the invention to any particular position or orientation.

Embodiments of the present invention are related to embodiments described in U.S. Provisional Patent Application No. 60/999,833 filed Oct. 18, 2007; U.S. Provisional Patent Application No. 61/279,602 filed Oct. 23, 2009; U.S. Patent Application Publication No, US 2009/0101195 A1; and U.S. Pat. No. 7,578,109 B2 issued Aug. 25, 2009, the disclosure of each of which is incorporated herein by reference.

Figure 1:
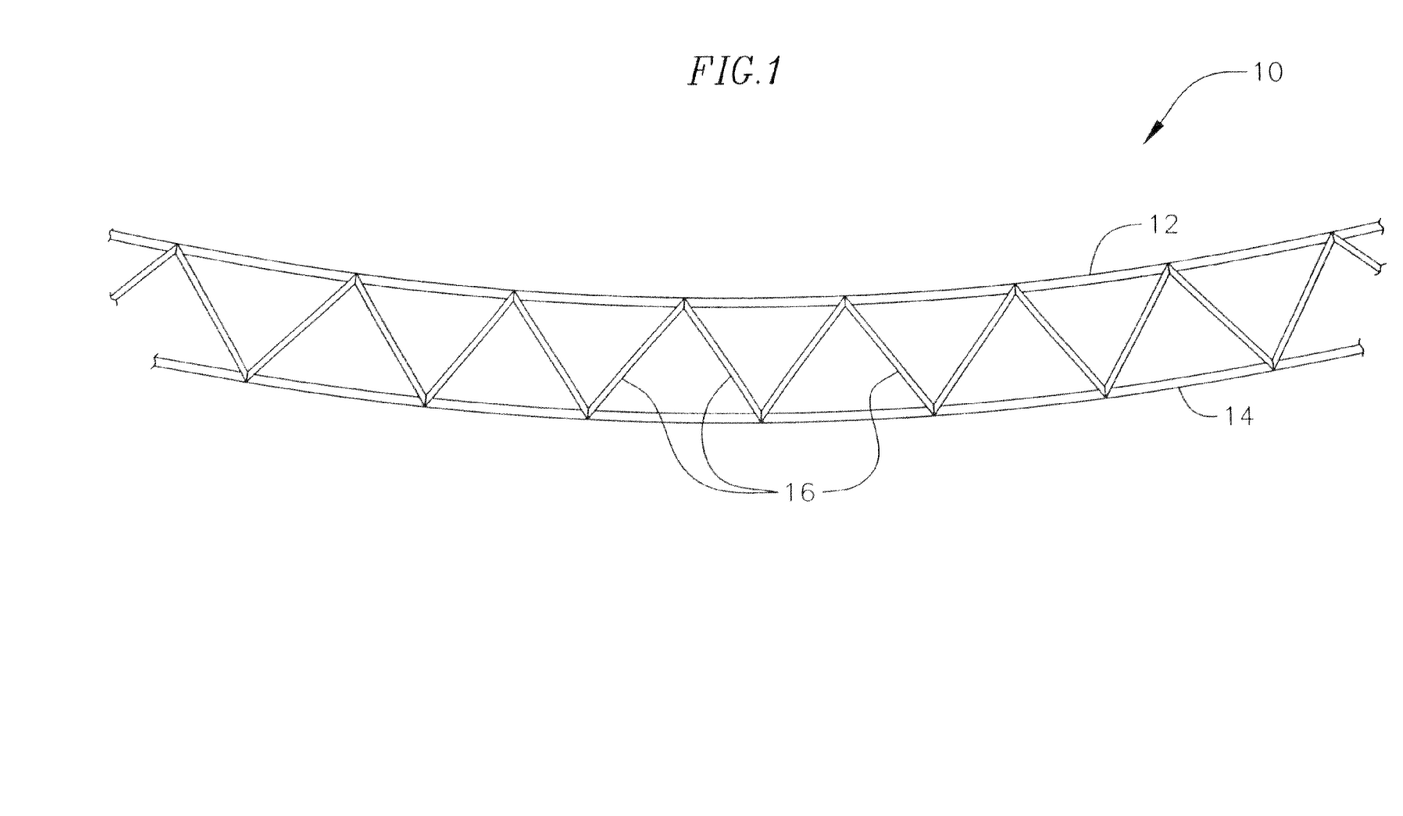
FIG. 1 is a front schematic view of a typical curved truss design.

With reference to FIG. 1, a typical curved truss structure 10 includes an upper chord 12, a lower chord 14, and diagonal elements 16, or lacing. The diagonal elements 16 extend between and connect the upper and lower chords 12, 14 at various locations to provide strength and rigidity to the truss structure 10.

Figure 2:
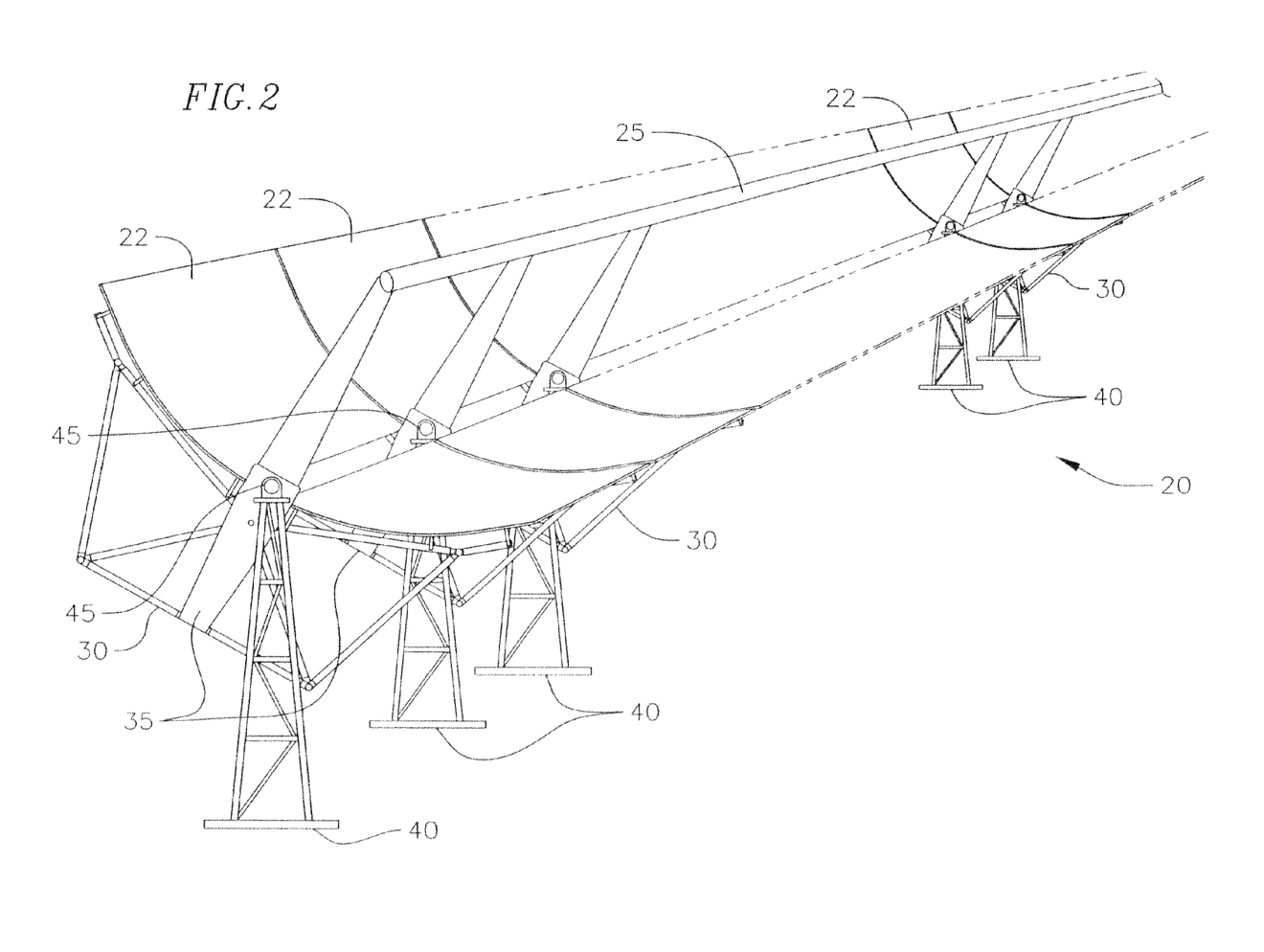
FIG. 2 is a perspective schematic view of a solar concentrator assembly.

With reference to FIG. 2, a solar concentrator assembly ("SCA") 20 includes a row of parabolic, cylindrically curved, or otherwise curved, troughs 22 for collecting radiant solar energy. The troughs 22 have reflective surfaces for reflecting and focusing the radiant energy on a heat collection tube 25. Each of the troughs 22 is supported by a corresponding trough frame 30, which may be constructed of tubes, bars, extrusions, and/or any other suitable structural members for supporting and maintaining the critical shape of each of the troughs 22 and the reflective surfaces thereon. Each of the trough frames 30 may include two torque plates 35, one on either side, for coupling to and supporting the trough frames 30 on supporting pylons 40. The torque plates 35, may, for example, be coupled to the supporting pylons 40 at bearings 45.

Some exemplary embodiments of the present invention are described herein the context of a particular application and practical use of them, namely, a light reflective panel assembly 50 (see FIG. 5) useful to define a portion of a cylindrically curved, trough-like mirror, such as used with the trough 22 of the SCA 20 described above and shown in FIG. 2, as used in a solar thermal electric power generation facility. That is, the reflective surfaces of the troughs 22 of the SCA 20 described above and shown in FIG. 2 may be embodied as the thin-sheet panel assembly 50 shown in FIG. 5. The configuration of the thin-sheet panel assembly 50 provides rigidity to the thin mirror and also maintains the reflective mirror surface in a shape having a desired curvature. As such, the reflective surfaces of the troughs 22 will be configured to maintain a selected curvature for focusing solar radiation.

Figure 3:
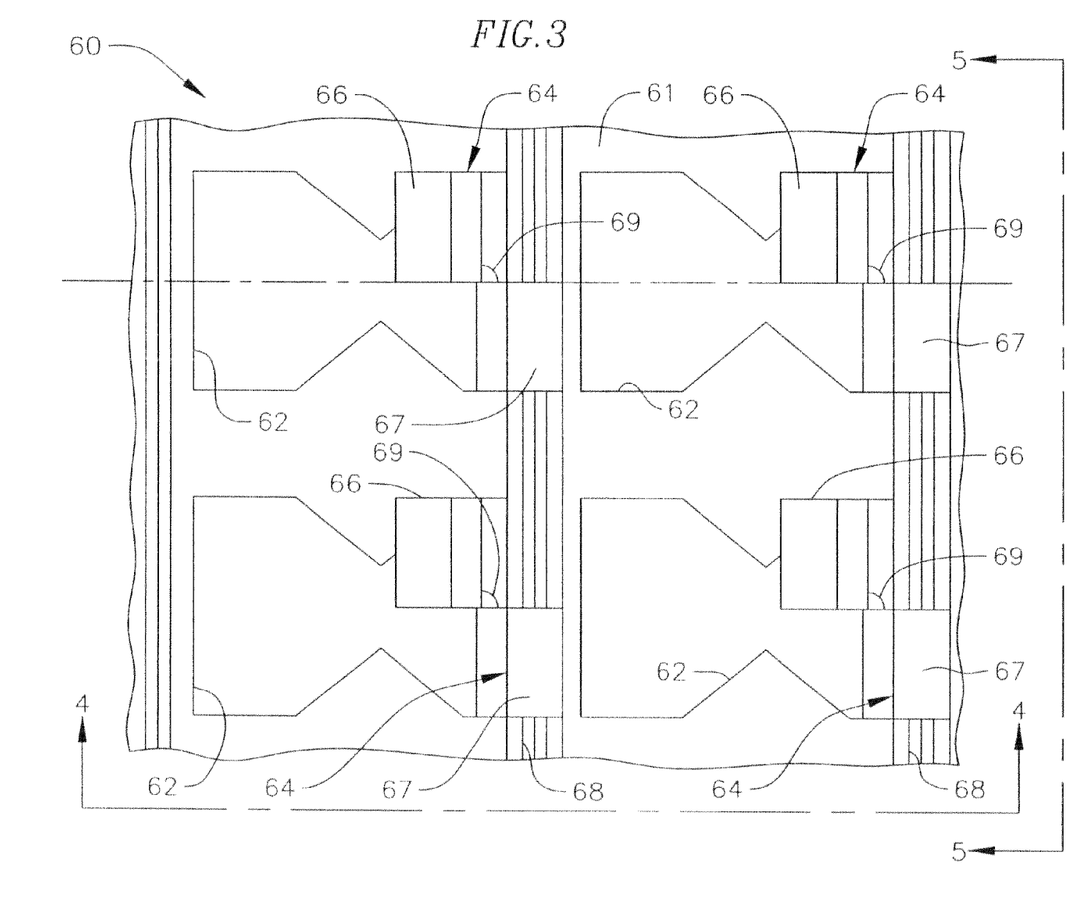
FIG. 3 is a fragmentary plan view of a backer for a thin mirror according to an embodiment of the present invention, e.g., the backer being shown as formed to constitute a component of a mirror panel assembly.
Figure 4:
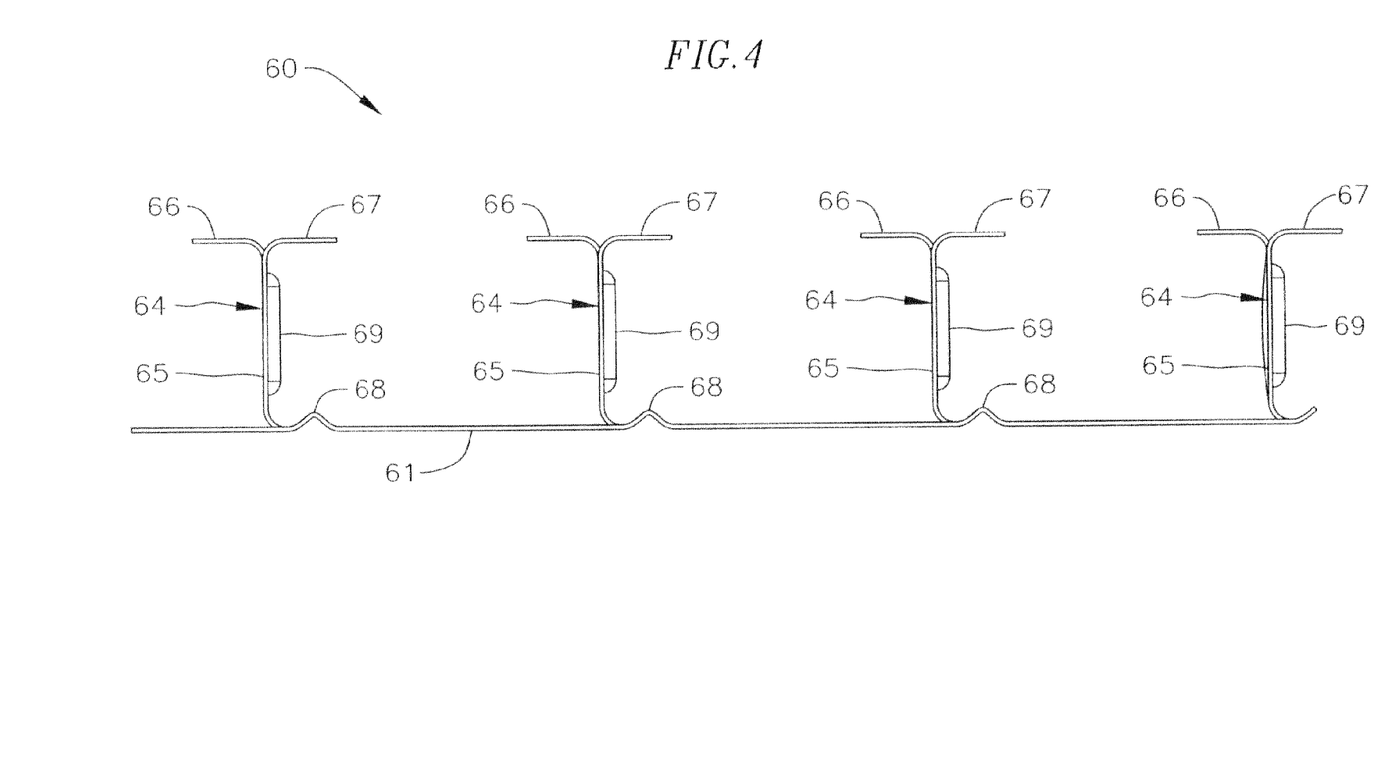
FIG. 4 is an elevation view of the backer of FIG. 3 taken along line 4-4.
Figure 5:
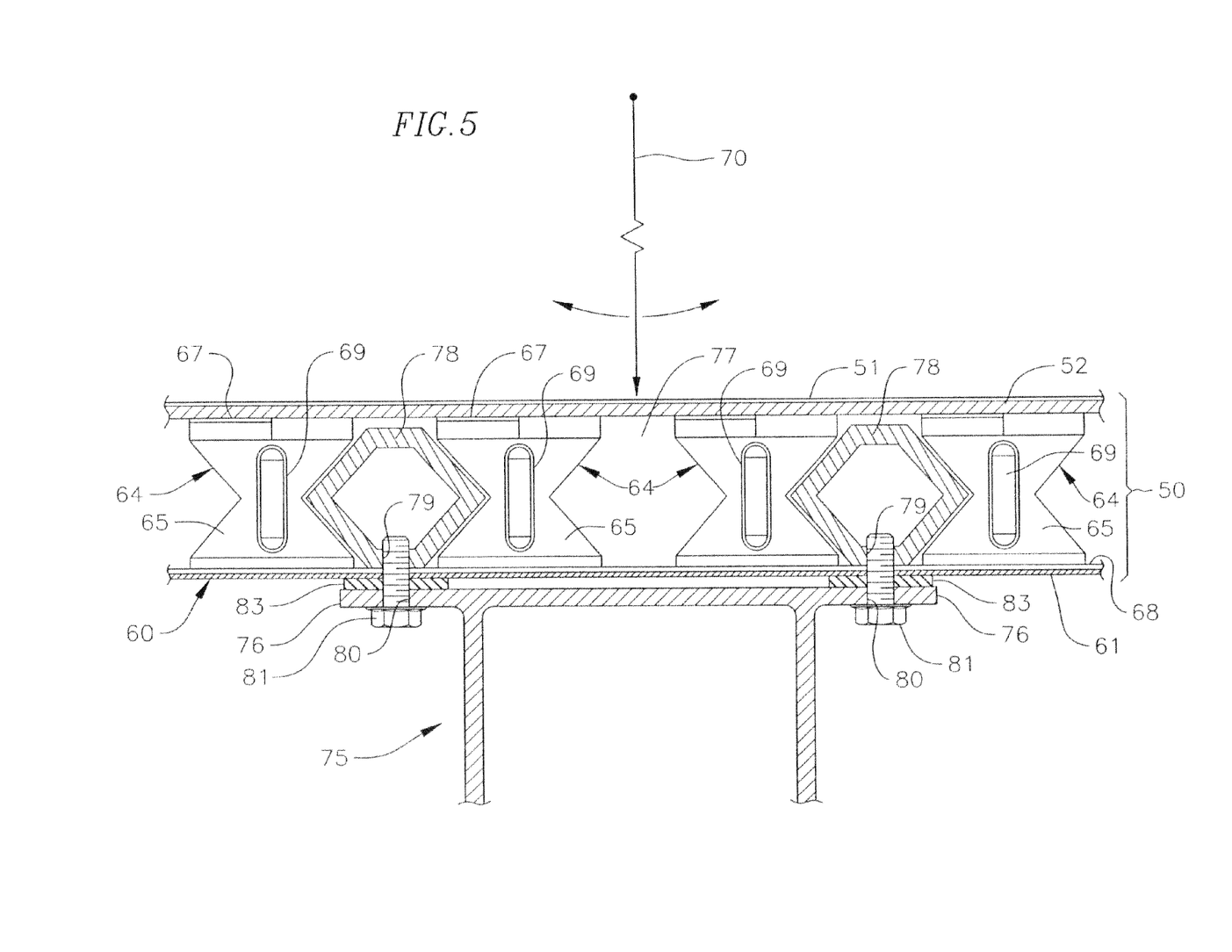
FIG. 5 is at elevation view of the backer of FIG. 3 taken along line 5-5 showing the backer as assembled into a mirror panel assembly which is shown mounted to a support for the panel assembly.

In one exemplary embodiment, the reflective mirror aspect of the panel assembly 50 is a thin sheet mirror 51. The thin sheet mirror 51 can be a thin glass mirror which is flexible due to its small thickness, or it can be a thin synthetic plastic film which includes a light reflective layer. In either instance, the thin sheet mirror 51 is suitably bonded to a structural substrate 52 which is of sheet-like nature and which is sufficiently flexible that it can be bent to the final curvature desired for the intended usage of the mirror. The structural substrate 52 together with the thin sheet mirror 51 function as an upper truss chord in the panel assembly 10. In FIG. 5, according to an exemplary embodiment, the thin sheet mirror 51 is a thin film mirror having a thickness of about 0.5 mm which is carried by a substrate (e.g., an aluminum sheet substrate) which has a smooth unfeatured surface to which the minor film is applied and secured. In another embodiment, the thin sheet mirror may be a thin glass mirror about 1.5 mm thick carried on a smooth surface metal (e.g., aluminum) substrate sheet. The substrate has a desired thickness defined so that it functions effectively as a top truss chord in the mini-truss mirror panel assembly 50 shown in FIG. 5. In another embodiment, the structural substrate 52 may be omitted. In addition to substrate 52 and the thin mirror 51 carried by it, the other principal component of panel assembly 50 is a backer 60 which is depicted in FIGS. 3, 4, and 5. The backer 60 is defined to function as the lower chord and the struts, or diagonals, (lacing) in the truss aspects of panel assembly 50.

The backer 60 is defined by a backer sheet 61, such as an aluminum or stainless steel sheet, and in one exemplary embodiment is an aluminum sheet having a thickness of about 0.020 inches. The backer 60 may be formed by use of a progressive die set, to define plural risers 64 integrally connected at their bases to the backer sheet 61. That is, the risers 64 function as the truss diagonals, while the remaining, or lower, portion of the backer sheet 61 other than the risers 64 functions as the lower truss chord. As shown in FIG. 3, in one embodiment, the risers 64 are integrally connected to and bent upward from the backer sheet 61 to define openings 62 in the backer sheet 61. Alternatively, the risers 64 may be separately formed and coupled to the backer sheet 61, such as via welding or an adhesive. The risers 64 are arranged in regularly spaced rows and columns across the length and width, respectively, of the backer sheet 61. The risers 64 are depicted in side elevations as seen in the column direction in FIG. 4 and in front or face elevation as seen in the row direction in FIG. 5. In one embodiment, the riser base-to-base spacing in the column direction (FIG. 4) can be about 1.246 inch and in the row direction (FIG. 5) can be about 0.337 inch. The riser base width can be about 1.1 inch. The riser height (FIG. 4) can be about 0.852 inch. Of course, embodiments of the present invention are not limited by the above-described dimensions and, in other embodiments, the risers 64 may have any other suitable dimensions. The riser top width preferably is substantially equal to the riser base width. The portion of a riser 64 between its base and top end is the body 65 of the riser 64. According to one embodiment, in each column the bodies 65 of the several risers 64 lie in a common plane, and the planes of the several columns are parallel to each other. According to an exemplary embodiment, each of those planes is perpendicular, at the riser 64 bases, to the plane of the backer sheet 61 in which the risers 64 are defined.

FIG. 5 shows that when seen in the row direction, each riser body 65 has an "hourglass" shape between its base and its top, in that the width of the riser 64 at its mid-height is less than its base width. In one embodiment, the riser mid-height widths can be about 0.5 inch. The side edges of each riser 64 from its mid-height to both its base and top ends preferably are straight, as shown in FIG. 5.

At its top end, each riser 64 is formed to define a pair of connection tabs or pads 66 and 67 in a common plane perpendicular to the height of the riser 64. The pads 66 and 67 extend in opposite directions from the riser 64. In one embodiment, pad 66 extends rearward of the riser 64 (to the left as seen in FIG. 4) and pad 67 extends forward of the riser 64 (to the right as seen in FIG. 4). In one embodiment, the width of each pad in a direction perpendicular to the basic plane of its riser 64 can be about 0.15 inch. The top surfaces of pads 66 and 67 enable the riser 64 to be affixed, as by gluing, to the reverse surface of mirror substrate 62 in the course of the final fabrication of the panel assembly 50.

The sloping side edges of the risers 64, produced by the "hourglass" shape of riser bodies 65, is desirable to reduce stress concentrations in the connections of the riser bases to the backer sheet 61. Stress concentrations can arise in the backer at the riser bases for a variety of reasons, including the reason that the backer 60 is curved in the column direction of the hacker 60 where, as noted above, the completed panel assembly 50 is to be used to define a section of a parabolically curved cylindrical mirror in a solar trough solar concentrator array. Such curvature of the panel assembly 50 is shown schematically in FIG. 5 by radius of curvature 70 which may vary in length from place to place across the width of the panel assembly 50.

In the formed-ready-for-assembly state of the backer 60 as shown in FIGS. 3 and 4, and also in FIG. 5, the backer sheet 61 can define a plurality of ribs or corrugations 68 which extend in the column direction of the backer sheet. The ribs 68 extend upwardly in the backer sheet 61. Each rib 68 is located in the backer 60 just forwardly of the base ends of the risers 64 in a respective column of risers 64. Each rib 68 has a crest height above the adjacent surface of the backer sheet 61 which, in one embodiment, can be about 0.08 inches. The ribs 68 stiffen the backer 60 against deflection under compressive lower chord loads applied to the backer 60 in the direction of the ribs 68. Compressive chord load deflections of the upper chord of panel assembly 50 are resisted by the thickness of substrate sheet 52 which can be thicker than the backer sheet 61 for that purpose. Also, in that state of the backer 60, vertical stiffness can be provided in the risers 64 as elongate dimples 69 in the riser material. The dimples 69, in an exemplary embodiment, have a vertical extent which is greater than one-half the riser height, and they preferably are centered in the height of the risers 64. The ribs 68 and dimples 69 can be omitted if chord loads or panel assembly compressive loads are expected to be low in use of a panel assembly.

FIG. 5 shows how a fully fabricated panel assembly 50 can mounted to a minor support frame, such as the trough frame 30 shown in FIG. 2 and/or a solar trough minor support frame of the V-top kind described in U.S. Pat. No. 7,578,109 B2 issued Aug. 25, 2009, the disclosure of which is incorporated herein by reference. To efficiently mount and support the curved minor panel assembly 50, the mirror support frame preferably includes longitudinally extending minor support tubes at spaced locations across the of the frame. Those tubes preferably are defined by aluminum extrusions. In FIG. 5, a frame minor support tube, or frame stringer, is shown at 75. Stringer 75 includes a square tube portion, part of which is shown in FIG. 5, from the top of which substantially coplanar lateral flanges 76 extend in opposite directions. Flanges 76 form structural features of the mirror support frame which facilitate connection of the panel assembly 50 to the frame.

As shown in FIG. 5, because of the "hourglass" shape of the bodies 65 of the risers 64, a generally hexagonally shaped space is formed between adjacent risers 64 in each column of risers 64. In the row directions of panel assembly 50, those hexagonal spaces are linearly aligned to create a gallery 77 of hexagonal cross-section shape between each adjacent two rows of risers 64. When the panel assembly 50 is placed properly adjacent frame stringer 75 for connection of the panel assembly to the frame stringer 75, the adjacent surface of the frame stringer 75 preferably subtends three galleries 77 (i.e. a central gallery and two side galleries) with each side gallery lying adjacent a respective one of the stringer lateral flanges 76. In one embodiment, a pressure bar 78 is present in each side gallery and extends along the length of its gallery. However, in other embodiments of the present invention, the number of pressure bars 78 on the panel assembly 50 and corresponding to each of the frame stringers 75 may be varied depending on the application. The pressure bars 78 preferably are inserted into their respective receiving galleries before the backer 60 is placed in a forming mold (see U.S. Patent Application Publication No. US 2009/0101195 A1, the disclosure of which is incorporated herein by reference, at paragraphs 0079-0085) for connection to the mirror sheet 51 via its supporting substrate 52.

Each pressure bar 78 has an exterior configuration which is similar to the cross-sectional shape of its hexagonal gallery 77 but with some clearance between the sides of the pressure bar 78 and the side edges of the adjacent risers 64. That clearance enables the riser 64 upper ends to move toward each other as the backer 60 deflects in the forming mold to conform to the mold curvature. The pressure bars 78 may be solid in cross-section, but preferably, are hollow to reduce their weight and cost. The pressure bars 78, in one exemplary embodiment, are aluminum extrusions.

The arrangement of pressure bars 78 between rows of risers 64 which is shown in FIG. 5 may be duplicated at each location in the panel assembly 50 which will be positioned adjacent a frame stringer 75. At an appropriate time, such as before placing the pressure bars 78 in their hexagonal galleries or after removal of the panel assembly 50 from its forming mold, a tapped (internally threaded) hole 79 is formed through the backer sheet 61 and into the adjacent portion of a pressure bar 78 at each of several spaced locations along the length of each pressure bar 78. For each hole 79, there is a corresponding hole 80, preferably not internally threaded, formed through the pertinent stringer flange 76 at an appropriate location. The finished panel assembly 50, in one embodiment, is secured to the mirror support frame by use of bolts 81 passed through flange holes 80 and threaded into the pressure bar holes 79 to hold the panel assembly 50 securely on the support frame. If desired, a resilient washer, o-ring, or gasket element 83 may be placed between the bottom surface of backer sheet 61 and the adjacent stringer flange 76 in association with each bolt 81. Also, if desired, a washer (not shown) can be positioned between each bolt head and the adjacent surface of flange 76.

It is preferred, consistent with the material used to create the thin sheet mirror of panel assembly 50, that the components of a panel assembly 50 (i.e. its mirror substrate 52 and backer 60) be defined by a material (or materials) which have thermal expansion coefficients which match, as closely as possible, the thermal expansion coefficient of the mirror mounting stringers, as well as the other components of the mirror support frame. Such matching of thermal expansion coefficients results in the panel assembly being subject to minimal temperature related forces. Such forces can produce changes in the shape of the panel assembly as it and its supporting structure experiences changes in temperature. Changes in the shape of the panel assembly, notably the curvature of the mirror, can cause the mirror to lose its ability to sharply focus reflected sunlight on a heat collector element located at the design focal point (or line) of the mirror.

Figure 6:
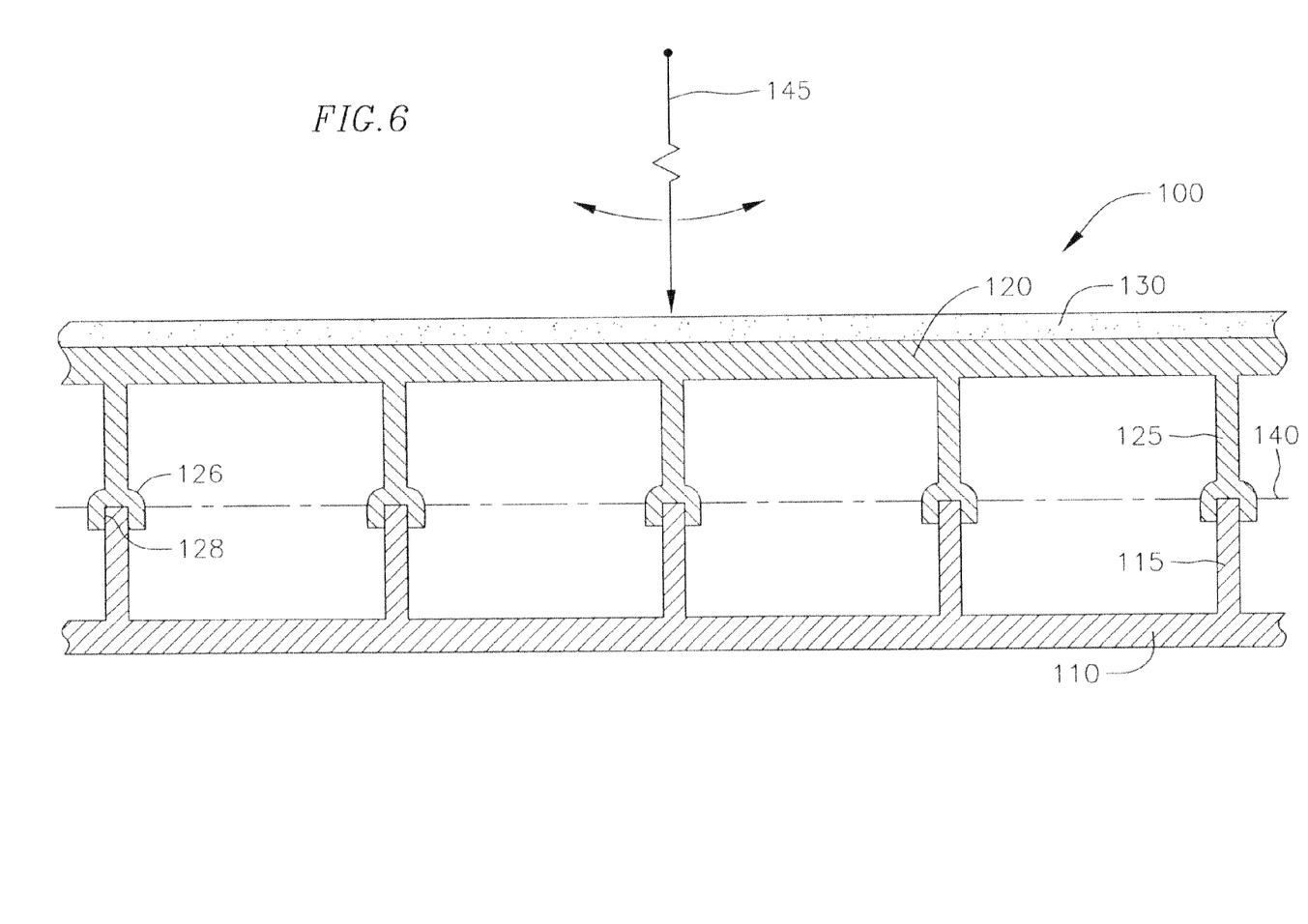
FIG. 6 is a sectional view of a thin-sheet panel assembly according to another embodiment of the present invention.

With reference to FIG. 6, a thin-sheet panel assembly 100 according to another embodiment of the present invention includes a backer 110, a substrate 120, and a thin sheet 130 attached to an upper surface of the substrate 120. The thin sheet 130 may be a reflective thin sheet, such as a thin-glass mirror or a thin-film mirror, similar to the thin sheet mirror 51 described above. The backer 110 may be a polycarbonate sheet or any other suitable material. Further, the backer 110 includes a plurality of ribs 115 extending from an upper surface of the backer 110 toward the substrate 120. The ribs 115, in one embodiment, have a substantially rectangular cross-sectional shape and extend in a longitudinal direction of the panel assembly 100. The substrate 120 may be a polycarbonate sheet or any other suitable material. The substrate 120 also includes a plurality of projections 125 extending from a lower surface of the substrate 120 toward the backer 110. The projections 125, in one embodiment, have a substantially rectangular cross-sectional shape and extend in a longitudinal direction of the panel assembly 100. Further, the projections 125 are arranged at locations corresponding to locations of respective ones of the ribs 115 for coupling corresponding projections 125 and ribs 115 to each other. In one embodiment, as shown in FIG. 6, each of the projections 125 has a cup-shaped protrusion 126 at a lower end thereof and having a slot 128 formed therein for receiving an upper end of a corresponding one of the ribs 115. That is, the ribs 115 are coupled to corresponding ones of the projections 125 in the slots 128 to form interlocking longitudinal joints. According to one embodiment, the ribs 115 may be attached to the corresponding projections 125 with a solvent or other suitable adhesive or device.

Similar to the panel assembly 50 described above and shown in FIG. 5, the thin-sheet panel assembly 100 may be a curved mirror panel assembly mounted to a mirror support frame, such as the trough frame 30 shown in FIG. 2 and/or a solar trough mirror support frame of the V-top kind described in U.S. Pat. No. 7,578,109 B2 issued Aug. 25, 2009, the disclosure of which is incorporated herein by reference. To efficiently mount and support the curved mirror panel assembly 100, the mirror support frame preferably includes longitudinally extending mirror support tubes, such as the stringers 75 described above, at spaced locations across the width of the frame. The thin-sheet panel assembly 100, in one embodiment, is curved along a neutral plane 140 where, as noted above, the completed panel assembly 100 is to be used to define a section of a parabolically curved cylindrical mirror in a solar trough solar concentrator array. Such curvature of the panel assembly 100 is shown schematically in FIG. 6 by radius of curvature 145 which may vary in length from place to place across the width of the panel assembly 100.

Although the drawings and accompanying, description illustrate embodiments of a thin-sheet panel assembly as applied to a solar collector trough, it will be apparent that the novel aspects of the thin-sheet panel assemblies of the present invention may also be carried out by utilizing alternative structures, sizes, shapes, and/or materials in other embodiments of the present invention. For example, in some embodiments of a thin-sheet panel assembly according to the present invention, a thin panel, such as described above with respect to the thin-sheet panel assembly 50 as the thin sheet 51, may not be reflective, but rather, may be formed of an alternative material for purposes of decoration, strength, or otherwise. Embodiments of the thin-sheet panel assembly may, for example, be applied to any market sector, such as, but not limited to, solar power generation, science, structural or decorative architecture, and industry.

The preceding description has been presented with reference to various embodiments of the invention. Persons skilled in the art and technology to which this invention pertains will appreciate that alterations and changes in the described structures and methods of operation can be practiced without meaningfully departing from the principles, spirit, and scope of this invention.

What is claimed is:

1. A support structure for a flexible panel, the support structure comprising:
   a backer sheet;
   a plurality of risers, each riser defined by a cutout portion of the backer sheet, each riser having a riser body having a length and extending from a riser first end portion to a riser second end portion located opposite to the riser first end portion relative to the length of the riser body, the riser body having two laterally opposite free edges extending the length of the riser body, the riser first end portion being bent from the backer sheet such that the riser body extends away from the backer sheet to the riser second end portion; and a first tab and a second tab defined by the riser second end portion of each riser, the first tab extending transverse to the riser body in a first direction, and the second tab extending from the riser body in a second direction generally opposite to the first direction.

2. The support structure of claim 1, wherein the backer sheet, the plurality of risers and the first and second tabs are a one-piece continuous part.

3. The support structure of claim 1, wherein the backer sheet defines a first plane, wherein the first and second tabs define a second plane, and wherein the first plane and the second plane are generally parallel.

4. The support structure of claim 1, wherein each riser comprises a reinforcing rib.

5. The support structure of claim 1, wherein the backer sheet comprises a plurality of reinforcing ribs.

6. The support structure of claim 1, wherein each riser is hour-glass shaped.

7. A panel assembly comprising:
   a flexible panel having an front surface and a back surface opposite the front surface;
   a support structure comprising:
      a backer sheet;
         a plurality of risers, each riser defined by a cutout portion of the backer sheet, each riser having a riser body having a length and extending from a riser first end portion to a riser second end portion located opposite to the riser first end portion relative to the length of the riser body, the riser body having two laterally opposite free edges extending the length of the riser body, the riser first end portion being bent from the backer sheet such that the riser body extends away from the backer sheet to the riser second end portion; and
      a first tab and a second tab defined by the riser second end portion of each riser, the first tab extending transverse to the riser body in a first direction, and the second tab extending from the riser body in a second direction generally opposite to the first direction;
   wherein the first tab and the second tab of each riser are attached to the back surface of the flexible panel.

8. The panel assembly of claim 7, wherein the first tab and the second tab are attached to the back surface of the flexible panel with an adhesive.

9. The panel assembly of claim 7, wherein the backer sheet, the plurality of risers and the first and second tabs are a one-piece continuous part.

10. The panel assembly of claim 7, wherein the backer sheet defines a first plane, wherein the first and second tabs define a second plane, and wherein the first plane and the second plane are generally parallel.

11. The panel assembly of claim 7, wherein each riser comprises a reinforcing rib.

12. The panel assembly of claim 7, wherein the hacker sheet comprises a plurality of reinforcing ribs.

13. The panel assembly of claim 7, wherein the front surface of the flexible panel is a reflective surface.

14. The panel assembly of claim 7, further comprising reinforcing bars located in generally aligned openings, wherein each opening is defined by a space between adjacent risers.

15. The support structure of claim 1, wherein each riser is separate and spaced apart from an adjacent riser from the riser first end portion to the riser second end portion to define a space between adjacent risers from the riser first end portion to the riser second end portion.

16. The panel assembly of claim 7, wherein each riser is separate and spaced apart from an adjacent riser from the riser first end portion to the riser second end portion to define a space between adjacent risers from the riser first end portion to the riser second end portion.

17. A support structure for a flexible panel, the support structure comprising:
   a backer sheet having a length and a width;
   a plurality of risers disposed along the length of the back sheet and along the width of the backer sheet to define an array of risers on the backer sheet, each riser having a first end portion connected to the backer sheet and extending away from the backer sheet to a second end portion located opposite to the first end portion relative to a length of the riser, and each riser being separate and spaced apart from an adjacent riser from the first end portion to the second end portion to define a space between adjacent risers from the first end portion to the second end portion; and
   a first tab and a second tab defined by a section of the second end portion of each riser, the first tab and the second tab extending generally in opposite directions.

18. The support structure of claim 17, wherein the backer sheet, the plurality of risers and the first and second tabs are a one-piece continuous part.

19. The support structure of claim 17, wherein each riser comprises a reinforcing rib.

20. The support structure of claim 17, wherein the backer sheet comprises a plurality of reinforcing ribs.

\* \* \* \* \*